No. 611,607. Patented Oct. 4, 1898.
M. D. COLBATH.
DISH CLEANER.
(Application filed Mar. 22, 1898.)
(No Model.)

Witnesses
C. R. Carpenter
E. W. Fothergill

Inventor
Monroe D. Colbath,
By Millard Eddy,
Attorney

UNITED STATES PATENT OFFICE.

MONROE D. COLBATH, OF EASTON, MAINE.

DISH-CLEANER.

SPECIFICATION forming part of Letters Patent No. 611,607, dated October 4, 1898.

Application filed March 22, 1898. Serial No. 674,718. (No model.)

*To all whom it may concern:*

Be it known that I, MONROE D. COLBATH, of Easton, in the county of Aroostook, in the State of Maine, have invented certain new and useful Improvements in Dish-Cleaners, which improvements are described in the following specification and are illustrated by the accompanying drawings.

My invention relates to that class of dish-washing machines in which the dishes are exposed to a jet of water discharged from a moving nozzle.

It is the object of the invention to secure such a movement of the nozzle as will distribute the water in the best manner. To accomplish this object, I place in the middle of the receptacle for dishes a vertical pipe armed with a nozzle which is adapted to rotate orbitally over them.

The best manner in which I have contemplated applying the principles of my invention is shown in said drawings, by which the invention is illustrated.

Figure 1:
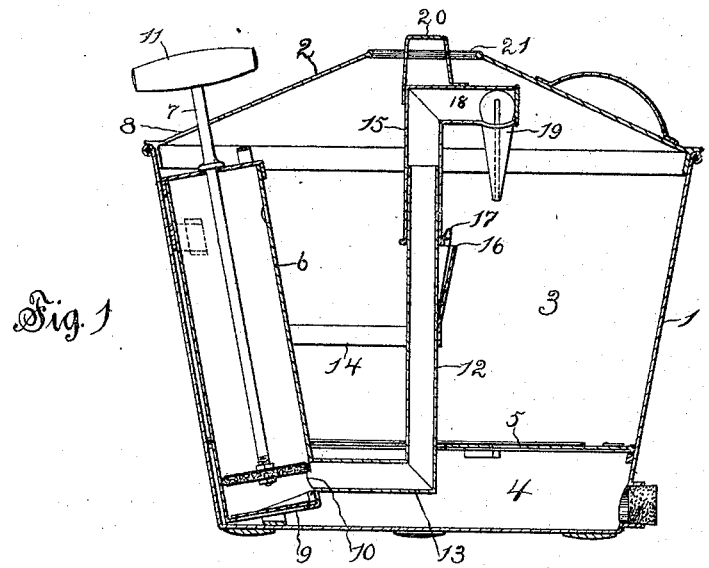
Figure 3:
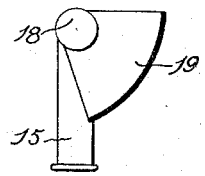
Figure 2:
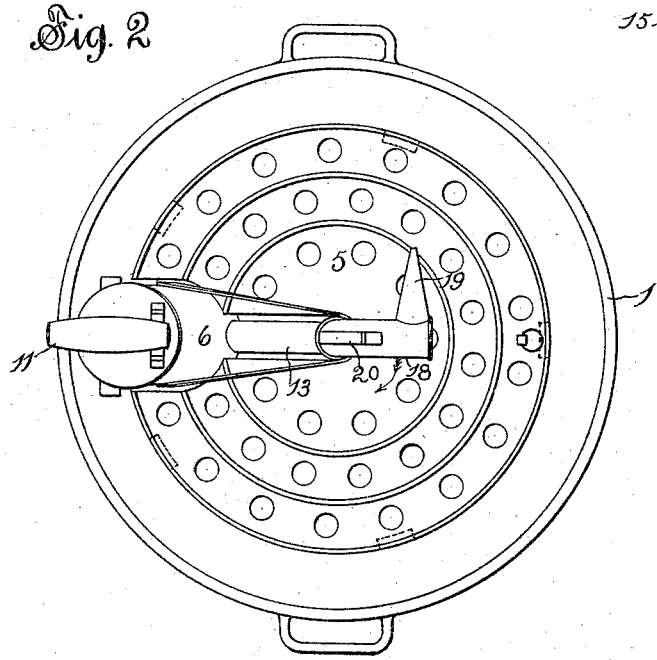

Figure 1 is a central vertical section of a dish-washing machine constructed in accordance with the requirements of my invention. Fig. 2 is a plan view of the same without the cover. Fig. 3 is a detail.

In the views Figs. 1 and 2 the numeral 1 denotes a circular sheet-metal pan or tub-shaped receptacle which is provided with a cover 2 and is divided into two compartments 3 and 4 by a perforated false bottom 5. At one side of the pan is a pump 6, which extends through a hole in the false bottom 5 and has a stem or piston-rod 7 extending through a slot 8 in cover 2. The induction and eduction ports of the pump are denoted by the numerals 9 and 10, respectively, and the handle by the numeral 11. In the middle of the pan is a vertical pipe 12, connected with the pump by the horizontal pipe 13 and held in place by the braces 14. Over the upper part of pipe 12 and above stop 16 is loosely fitted the vertical stand-pipe 15, which is held down to that stop by the spring-catch 17. Pipe 15 has a horizontal branch 18, ending in the nozzle 19, which is shown in each of said figures. Fig. 3 is a side view of pipe 15 and of nozzle 19, with an end view of branch pipe 18. As shown in Figs. 2 and 3, the nozzle 19 is directed obliquely downward from the branch pipe 18. This nozzle, being fan-shaped and having a long and narrow orifice along the curved portion of its perimeter, is adapted to emit a widening sheet of water in any vertical plane. From the top of pipes 15 and 18 a handle 20 reaches out through an opening 21 in cover 2.

Such being the construction of my improved dish-cleaner, its mode of operation is for the most part sufficiently obvious. When the dishes are placed in compartment 3 and pump 6 is operated by hand, the water drawn in from compartment 4 is driven through pipes 13, 12, and 18 and out at nozzle 19. Emerging from the nozzle 19 in the oblique direction indicated by the position of that nozzle as shown in the drawings the jet of water not only strikes forcibly upon the dishes, but also impels the nozzle in the direction which is indicated by the arrow in Fig. 2. The like rotation in either direction is capable of being imparted to the nozzle by manipulation of the handle 20, and by the same means the rotation may be stopped or retarded, as may be desired, so that by either or by both of these methods, at the pleasure of the operator, the nozzle is caused to travel orbitally over the dishes while discharging the suds or water against them from all points of its route.

Sometimes driven automatically by the jet alone in the manner described, and sometimes accelerated, sometimes retarded, and sometimes stopped by the manipulation of handle 20, the nozzles discharge into different parts of the receptacle in a variable and unequal manner and for unequal lengths of time, according to the different conditions and exposures of the different dishes in that receptacle, according to the unequal adhesiveness of the different substances that are to be cleaned off, and according to the judgment or skill of the operator.

Such being the construction and operation of my improved dish-cleaner, I claim as my invention—

In a dish-cleaning machine, a receptacle for dishes and for water, which receptacle is divided into two compartments by a perforated false bottom, a pump, which is set eccentrically in said receptacle, a stand-pipe, which is erected in the middle of said receptacle, and is connected with said pump, and a rotary fan-shaped nozzle, which is connected with said stand-pipe, and is directed obliquely downward and backward, in combination with a handle, which is connected with said nozzle, and is exposed through the cover of the receptacle, substantially as and for the purpose specified.

In testimony whereof I hereunto set my name in the presence of two witnesses.

MONROE D. COLBATH.

Witnesses:
WILLARD EDDY,
CATHARINE L. GUINEY.